No. 654,213. Patented July 24, 1900.
J. W. WILSON.
PIPE CUTTING DEVICE.
(Application filed Mar. 8, 1900.)
(No Model.)
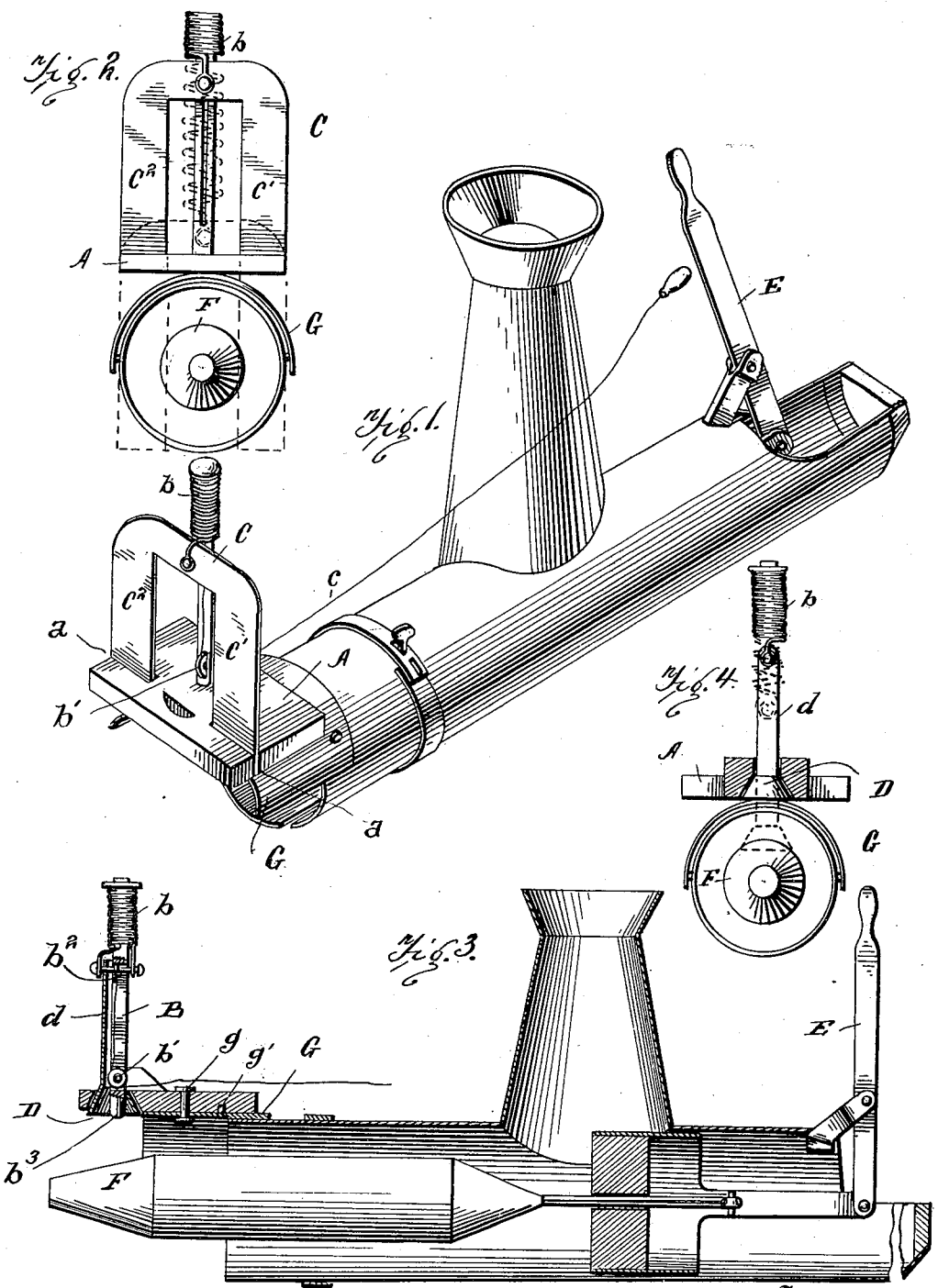

UNITED STATES PATENT OFFICE.

JOHN W. WILSON, OF SHANER, OKLAHOMA TERRITORY.

PIPE-CUTTING DEVICE.

SPECIFICATION forming part of Letters Patent No. 654,213, dated July 24, 1900.

Application filed March 8, 1900. Serial No. 7,904. (No model.)

*To all whom it may concern:*

Be it known that I, JOHN W. WILSON, of Shaner, county of Garfield, and Territory of Oklahoma, have invented certain new and useful Improvements in Pipe Forming and Laying Devices; and I do hereby declare the following to be a full and clear description thereof.

My invention is designed for cutting or forming openings into drainage or irrigation pipes of the character designed to be laid or formed by the apparatus shown and described in United States Patent No. 220,757. This apparatus lays a continuous and unbroken line of concrete pipe. As heretofore constructed, in order to permit drainage-water to enter the pipe the pipe was severed into separate sections, whereby when the pipe became undermined by washouts or otherwise it was possible for the undermined section to fall from its place, thus destroying the continuity of the drain-pipe.

The object of my present invention is to form openings without destroying the continuity thereof, such openings being formed in the sides of the pipe designed for drainage purposes and preferably formed on the top of pipes designed for irrigation purposes.

The inventive idea involved in my invention may receive various mechanical expressions, one of which is shown in the accompanying drawings, in which—

Figure 1 is a perspective view of the apparatus shown in the said Patent No. 220,757 with my improved pipe-cutting device attached thereto; Fig. 2, an end elevation thereof. Fig. 3 is a vertical central longitudinal section of Fig. 1, parts being shown in elevation, showing my cutting device, but with a modified form of the cutter. Fig. 4 is an end elevation of Fig. 3, parts being in section.

My pipe device may be employed on any suitable pipe-laying apparatus; but as here shown it consists of a suitable base-block A, having mounted thereon a standard B, which has secured thereto a coiled spring $b$, the lower end of which is attached to the cutter, which in Figs. 1 and 2 is indicated by the reference-letters C C. This cutter consists of an inverted-U-shaped piece of steel normally held in an elevated position by the spring $b$ and playing in suitable side slots $a$, formed in the base-block A. Secured to the upper bar of the cutter is a line $c$, which passes under a pulley $b'$ and then into a position to be operated by the workman who operates the handle E of the pipe-forming device. The space between the cutter-blades is slightly less than the width of the piston F of the pipe-forming device and is therefore slightly less than the interior diameter of the pipe when formed. The base-block A is secured to a hood G of the pipe-forming device in any suitable manner, preferably by means of a bolt $g$ (shown in Fig. 3) and pin $g'$, projecting from the hood and entering a recess in the block to hold it steadily in position.

The operation of the device as thus far described is as follows: The pipe-forming device having been operated to form a pipe in the manner described in Patent No. 220,757, the operator seizes the handle to cord $c$ and by pulling thereon depresses the knife or cutter C against the tension of the spring into the position shown by dotted lines in Fig. 2, thereby cutting a kerf or slot in each side of the pipe, through which water may enter for drainage purposes and through which it may escape for irrigating purposes. The kerfs or slots having been cut in the sides of the pipe, the operator releases the pull on the cord $c$, the spring $b$ elevates the knife C, and the work of forming the pipes proceeds as before until such length of section has been formed as is desired, when the workman again operates the cutter to cut another slot in the pipe.

When it is desired to cut an opening into the top of the pipe rather than the sides thereof, the knife C is removed and a circular punch or cutter D, Figs. 3 and 4, is substituted, this punch being secured to the spring by a stem $d$. In this construction, as well as that where the knife C is employed, the spring is preferably attached to the cutter by means of pin $b^2$, Fig. 3, extending through the slot in the standard B, thereby forming a guide to steady and control the action of the cutter. Referring to Fig. 4, it will be understood that when the cutter D is lowered by a pull on the cord $c$ a round hole or opening will be formed in the top of the pipe, and as the spring elevates the cutter upon release of the cord $c$ the lower end $b^3$ of the standard B serves as a punch to eject the portion removed from the pipe.

It will be observed that by means which I employ for cutting the pipe I leave it unbroken, with sufficient strength to support itself in case of slight washouts or similar action depriving the pipe of its foundation-supports.

Having thus described my invention, what I claim is—

1. In a pipe forming and laying device the combination of a cutter and a suitable support therefor, means for depressing the cutter, means for elevating the cutter above the pipe, and means for forming the pipe.

2. In a pipe forming and laying device the combination of a base-block and standard thereon, a cutter supported by said standard, means for depressing the cutter, a spring reacting between the standard and cutter to elevate the same, and means for forming the pipe.

3. In a pipe forming and laying device the combination of a base-block and standard thereon, a cutter, a spring connecting the standard and cutter and normally holding said cutter in elevated position, a cord secured to the cutter adapted to depress the same against the tension of the spring, and means for forming the pipe.

4. In a pipe forming and laying device the combination of a base-block, a U-shaped cutter supported thereon above the line of pipe, a spring normally holding said cutter in elevated position and means for depressing said cutter with its blades on opposite sides of the pipe.

In testimony whereof I have affixed my signature in the presence of two witnesses.

JOHN W. WILSON.

Witnesses:
HARRY SHARP,
M. R. GLASGOW.